(12) United States Patent
Nanayakkara et al.

(10) Patent No.: US 6,867,697 B2
(45) Date of Patent: Mar. 15, 2005

(54) SYSTEM FOR GUIDING THE VISUALLY HANDICAPPED

(76) Inventors: Pravin L. Nanayakkara, 2065 Park Ct., Boca Raton, FL (US) 33486; Anya R. Nanayakkara, 2065 Park Ct, Boca Raton, FL (US) 33486; Lakdas Nanayakkara, 2065 Park Ct., Boca Raton, FL (US) 33486

( * ) Notice: Subject to any disclaimer, the term of this patent is extended or adjusted under 35 U.S.C. 154(b) by 0 days.

(21) Appl. No.: 10/112,668

(22) Filed: Apr. 1, 2002

(65) Prior Publication Data

US 2003/0184441 A1 Oct. 2, 2003

(51) Int. Cl.$^7$ .............................................. G08B 23/00
(52) U.S. Cl. ................................ 340/573.1; 340/407.1; 340/825.19
(58) Field of Search ........................... 340/573.1, 573.4, 340/407.1, 825.19, 825.49, 541, 561; 342/24; 367/118; 701/200, 205

(56) References Cited

U.S. PATENT DOCUMENTS

| | | | | |
|---|---|---|---|---|
| 3,718,896 A | * | 2/1973 | Mowat | 340/573.1 |
| 4,025,922 A | * | 5/1977 | Trawick, III | 340/407.1 X |
| 4,095,214 A | * | 6/1978 | Minasy | 340/573.1 |
| 4,555,696 A | * | 11/1985 | Brown | 340/551 |
| 4,660,022 A | * | 4/1987 | Osaka | 340/407.1 |
| 5,144,294 A | * | 9/1992 | Alonzi et al. | 340/825.49 |
| 5,508,699 A | * | 4/1996 | Silverman | 340/407.1 X |
| 5,806,017 A | * | 9/1998 | Hancock | 701/209 |
| 6,356,210 B1 | * | 3/2002 | Ellis | 340/990 |
| 6,396,413 B2 | * | 5/2002 | Hines et al. | 340/825.49 |
| 6,477,463 B2 | * | 11/2002 | Hamilton | 701/211 |
| 6,486,784 B1 | * | 11/2002 | Beckers | 340/573.1 |

* cited by examiner

Primary Examiner—Thomas J Mullen, Jr.
(74) Attorney, Agent, or Firm—M. K. Silverman

(57) ABSTRACT

A system for guiding of the visually handicapped includes a continuous electrical conductor, in the nature of a wire or strip, having a substantially uniform conductivity embedded within a walkway to be traversed by the handicapped person. The system also including a proximity for detecting the conductor in which the detector may be in a shoe of the user or a tip of a walking cane. The system further includes a signalling element, in the nature of a vibrator, in electrical communication with the detector such that, through the presence of such vibration, the visually handicapped person is able to determine his proximity to the electrical conductor to determine that he is proceeding in a proper direction within or along the walkway. The signalling element is preferably provided with a switch, for example, a mercury switch, so that the shoe or cane circuit will become energized only upon the occurrence of movement or motion of the shoe or cane within which the proximity detector is located. The approach by a user to a location of interest along the walkway, such as an intersection, bathroom, or Braille telephone, may be indicated through the provision of a pattern of irregularity of the conductivity within the continuous electrical conductor. Different patterns of irregularity may indicate different advisories to the user.

16 Claims, 8 Drawing Sheets

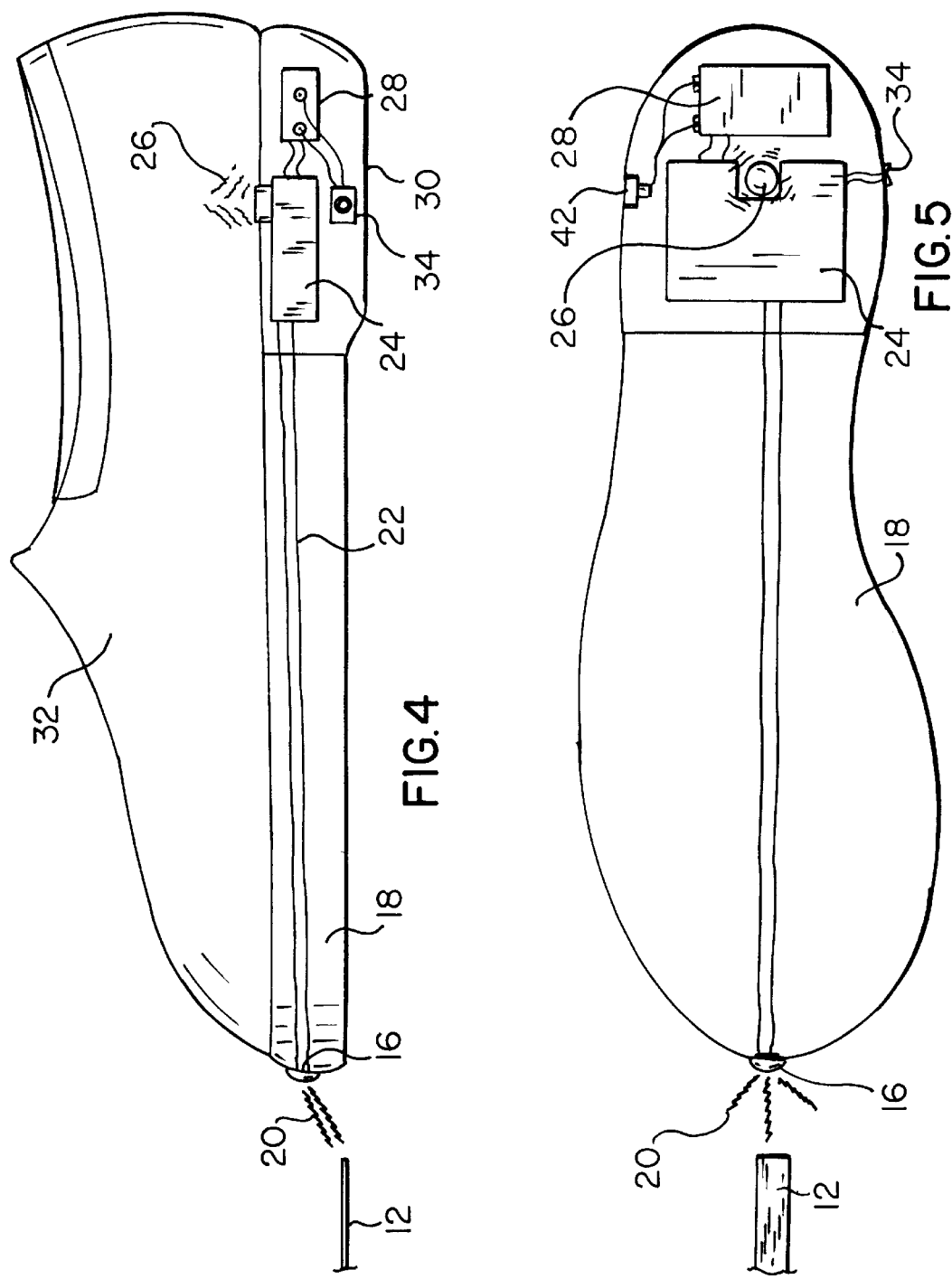

SYSTEM FOR GUIDING THE VISUALLY HANDICAPPED

BACKGROUND OF THE INVENTION

1. Area of Invention

The invention relates to guiding devices for use by persons including, but not limited to, the blind, visually impaired, security personnel, emergency personnel and fire fighters.

2. Prior Art

Guiding devices have been designed in which a signal is sent out from the device and is reflected from an object positioned above the walking level and returned to the device, this in the manner of a simplified type of radar or sonar to thereby operate a signalling means to indicate to the user that an object is in front of him. Systems of this type have, however, proven unsatisfactory due to difficulty in the interpretation of the types of signals returned in which a user can often confuse background objects with objects that are in the foreground. Such prior art is reflected in U.S. Pat. No. 3,360,775 (1967) to Schroeder.

A later device of this type is reflected in U.S. Pat. No. 3,718,896 (1973) to Moat in which, provided within a blindman's cane is a transmitter that transmits pulses of energy in a directional manner and a receiver which accepts the first or earliest returned pulses, rejecting all others for a predetermined period. Thereby, only those pulses relative to objects which are in the foreground are processed by the system.

More sophisticated systems, such as that reflected in U.S. Pat. No. 4,660,022, involve the use of sound generators selectably positioned at different locations, typically within corridors of a building or shopping mall in which a signal from the cane will actuate the sound generator to convey important information to the blind person, such as "intersection approaching," "bathroom approaching," or any other information deemed important for a blind person to obtain when in public places such as pedestrian crossings, railroad stations, airports, and passageways within public buildings. This approach however requires the positioning of such sound generators at numerous places within the public area or space of interest.

In recent years, the above has been improved upon through such approaches as radio-frequency guidance system for visually handicapped, as are reflected in U.S. Pat. No. 5,144,294 (1992) to Alonzi, et al, and U.S. Pat. No. 6,097,305 (2000) to Im, et al. Also, prior art of more recent vintage teaches complete electronic autorouting or navigation systems for the blind, as is reflected in U.S. Pat. No. 5,806,017 (1998) to Hancock, in which the entire routing or itinerary of a visually impaired person may be programmed at the beginning of a trip or may be programmed on a daily, weekly, or task-by-task basis.

The prior art, as reflected in the above, is unquestionably of great value to the visually impaired person if he is fortunate enough to live or work within an area which is able to afford systems of such sophistication.

Also, a further shortcoming of such prior art is that the visually handicapped person is readily identifiable as such by reason of the requirement that he at all times make use of a cane or the like. Thereby, the present invention seeks to address both the issue of cost and, particularly, the issue of social stigma attached to the use of a cane by a person who becomes visually impaired due to illness, accident, or physical condition later in life. Accordingly, within the present invention addresses an alternative to the historic need for use of a cane by blind persons or others having impediments in their mobility or recollection of how to navigate from one point to another.

SUMMARY OF THE INVENTION

The instant invention relates to a system for guiding of the visually handicapped including emergency personnel such as firemen and first aid staff in poorly lit passages which includes two continuous electrical conductors, in the nature of a wire or strip, having a substantially uniform conductivity, the same embedded within a walkway to be traversed by the handicapped person. The system also includes means for detecting proximity of a user to said conductors in which said means may be in the shoes of the user or a tip of a walking cane. The system further includes signalling means, in the nature of a vibrator, in electrical communication with said detecting means such that, through the presence of such vibration, the visually handicapped person is able to determine his proximity to the electrical conductors and, thereby, that he is proceeding in a proper direction within or along said walkway. The signalling means is preferably provided with a switch means, for example, a mercury switch, such that the circuit will become energized only upon the occurrence of movement or motion of the object within which the proximity detecting means is located. The approach by a user to a location of interest along the walkway, such as an intersection, bathroom, Braille telephone, or information counter may be indicated through the provision of a pattern of irregularity of the conductivity within said continuous electrical conductor. Different patterns of irregularity may indicate different advisories to the user. Also, varying the number of electrical conductors embedded, may identify and indicate different information to the user.

It is accordingly an object of the present invention to provide a guiding device for the visually handicapped, due to blindness or an environmental conditions such as lack of illumination, fog, smoke or the like to obviate the need for a walking cane or, alternatively, if a walking cane is employed, enhance the ease of use thereof to effect efficient navigation between points within areas and structures both public and private.

It is another object to provide a system of the above type to render blind persons less obvious when they are in public places.

It is a further object of the invention to provide a system and method for alleviating the uneasiness of visually impaired persons when they are seeking to reach destinations within areas that they are otherwise unfamiliar with.

It is a yet further object to provide a system of the above type having particular value to visually handicapped and other persons subject to forms of disorientation when they are walking in locations, both public and private, such as post offices, banks, schools, shopping malls, supermarkets, bus stops, taxi stands, railroad stations and airports and information centers. Such information centers may provide locations of important places with directions from pre-recorded audio messages available at a press of a button.

It is another object to provide a system for guiding of the blind that may be incorporated fully within an article of clothing, such as a shoe, of the user, thereby eliminating entirely the need for use of a walking cane.

The above and yet other objects and advantages of the present invention will become apparent from the hereinafter set forth Brief Description of the Drawings, Detailed Description of the Invention and claims appended herewith.

BRIEF DESCRIPTION OF THE DRAWINGS

FIG. 4 is a vertical schematic partial breakaway view showing a shoe which has been provided with an electrical proximity sensor in accordance with the invention.

FIG. 5 is a bottom schematic breakaway view of the shoe of FIG. 4.

DETAILED DESCRIPTION OF THE INVENTION

Figure 1:
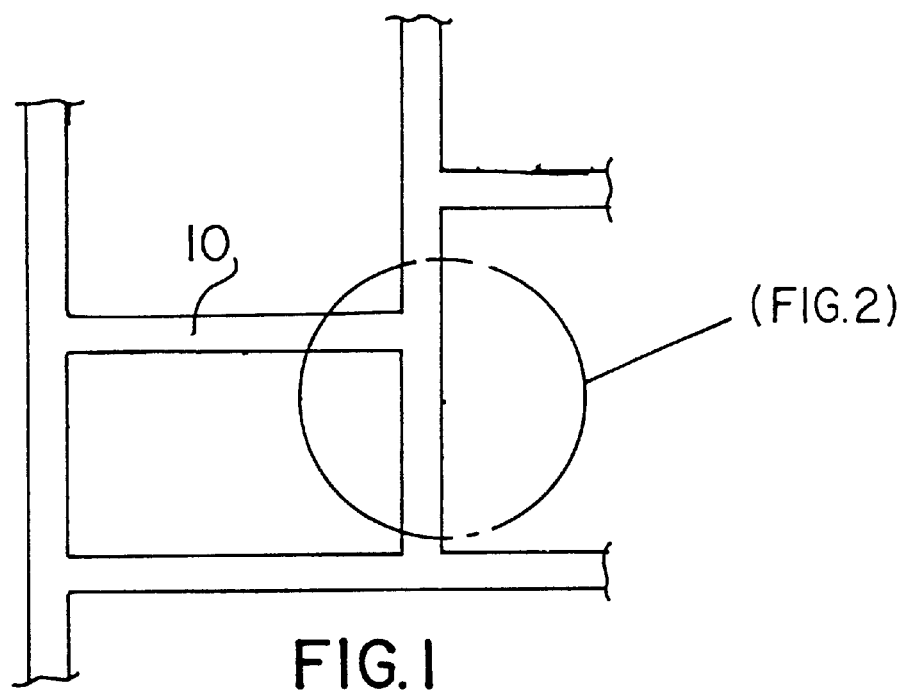
FIG. 1 is a top schematic view showing the locations within which continuous electrical conductors, in accordance with the invention, are provided within walkways of selected building and structure.

With reference to the overhead schematic view of FIG. 1, there may be seen a plurality of walkways 10 which may comprise walkways within public or private structures, residences, or walkways within an outdoor area, e.g., a downtown section of a city street. Embedded within each walkway or applied at substantially the surface thereof is a continuous electrical conductor 12 of substantially uniform electrical conductivity. See enlarged schematic view of FIG. 2. It has, in a preferred embodiment, been found that parallel pairs of metal conductors 12 will afford redundancy for purposes of the invention and will also enlarge the range of conductive material detecting means, as is set forth below.

Such sensors, and proximity sensors in general, operate upon a principle of response to changes in capacitance or inductance when introduced into a field 14 of a probe 15. See FIG. 3. When the necessary range setting of the probe is met, an alarm will trigger within a particular distance from the probe 15 and as the field 14 of the probe is changed, i.e., upon closing movement of the probe towards the metal conductor 12, respective changes in capacitance or inductance will occur unbalancing a set bridge circuit, described below. The bridge output is then passed through a signal amplifier which in turn will operates as audio or other alarm.

The strength of the signal received by the sensor is related to the distance between the sensor probe 15 and conductors 12, positioned on or in the walkway 10. The detectors will produce an output signal at or less than a specific distance between the sensor probe and conductors thereby producing said local pattern or field 14 of capacitive or inductive density as may be seen in the vertical cross-sectional view of FIG. 3. If there is no variation in field density produced by the excitation signal, the detector will produce a constant output which may be used to power any annunciation means such as a vibrator. However, if the proximity sensor drifts from the pathway defined by conductors 12, a change in the field pattern will occur, causing the eventual collapse thereof if the probe 15 is moved too far away from conductors 12. This change in output can be utilized to produce a warning signal to the user.

Applying the above principles to the instant invention, a sensor or conductor detecting means 16 is placed within a forward most portion of a shoe 18. See FIGS. 4 and 5. From said sensor 16 is produced the above-referenced excitation signal 20 from which field 14, about conductor 12, is produced. Through wires 22, sensor 16 is in electrical communication with signalling means 24 in the nature of a vibrator 26, such that a user of the system is advised that he is correctly navigating walkway 10.

Also shown in FIG. 4 is a battery pack 28 which, like signalling means 24, is embedded within heel 30 of shoe 32. Further shown therein is an on-off switch 34 by which a user may turn off the entire system if he is either not using shoe 32 or is in a location not provided with conductors 12 of the present invention. The above elements are shown in bottom breakaway view in FIG. 5. It should be further noted that battery a pack 28 may be provided with a motion detector, such as a mercury switch 42, so that the circuit of FIGS. 4 and 5 is closed and, thereby, the system activated, only in the event of movement of the shoe 32.

It is to be appreciated that the present system may be provided with means by which the character of vibration 26 becomes more noticeable to the user if electromagnetic field contact is diminished or lost entirely between sensor 16 and walkway conductors 12. There is thereby provided a means by which a visually handicapped or other cognitively impaired person, may navigate about and within a defined area without requirement for the use of a walking cane or the like.

It is to be further appreciated that modifications, in the nature of programmed irregularities 36, in the pattern of conductivity may be provided at locations such as intersection 37 (see FIG. 2), a bathroom 38 or Braille signs 40 at which a variety of useful information may be furnished to blind persons in an area new to him, such as may be the case at an airport or shopping mall. Different patterns of irregularity may correlate to different types of locations or intersections.

Figure 3:
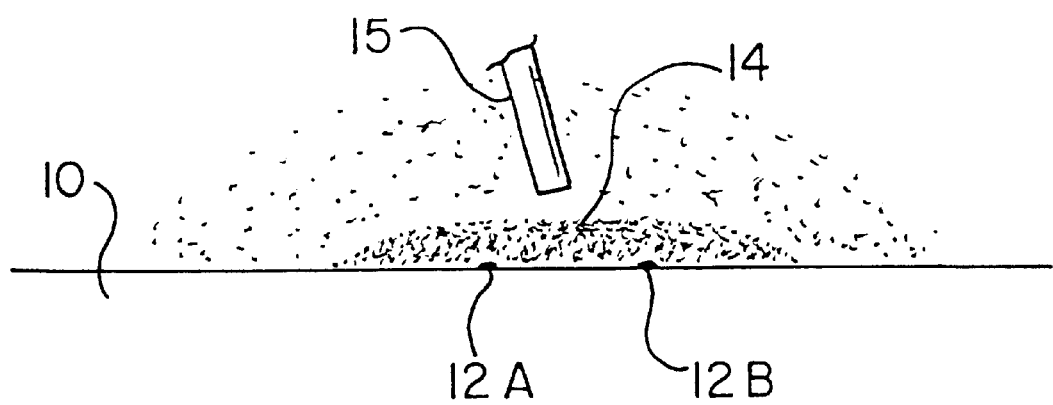
FIG. 3 is a vertical cross-sectional view taken through the floor of the walkway of FIG. 1 showing a positioning of two conductors, such that one or both conductors may be sensed by a sensor within in a shoe or cane.
Figure 2:
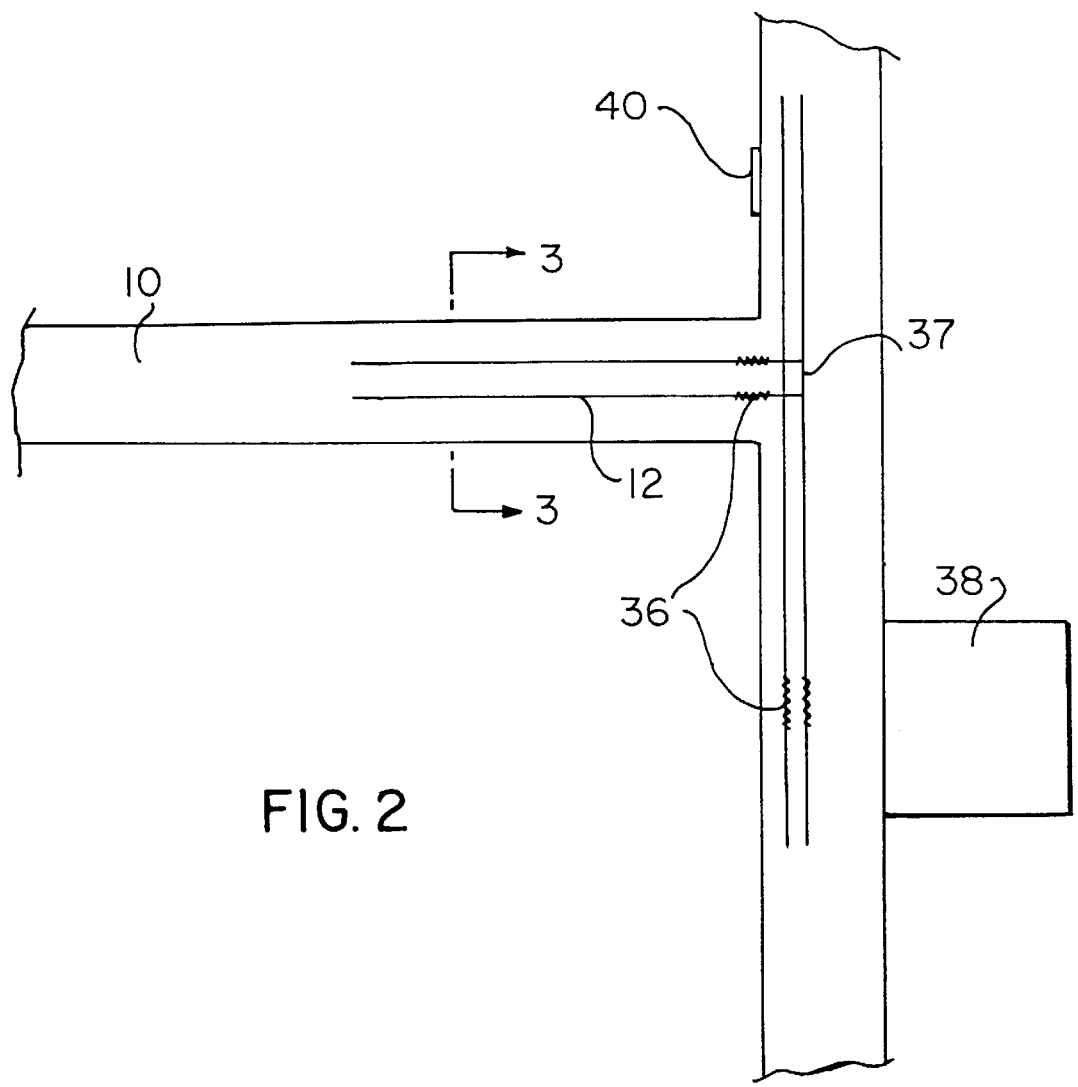
FIG. 2 is an enlarged view of the indicated part of FIG. 1.
Figure 6:
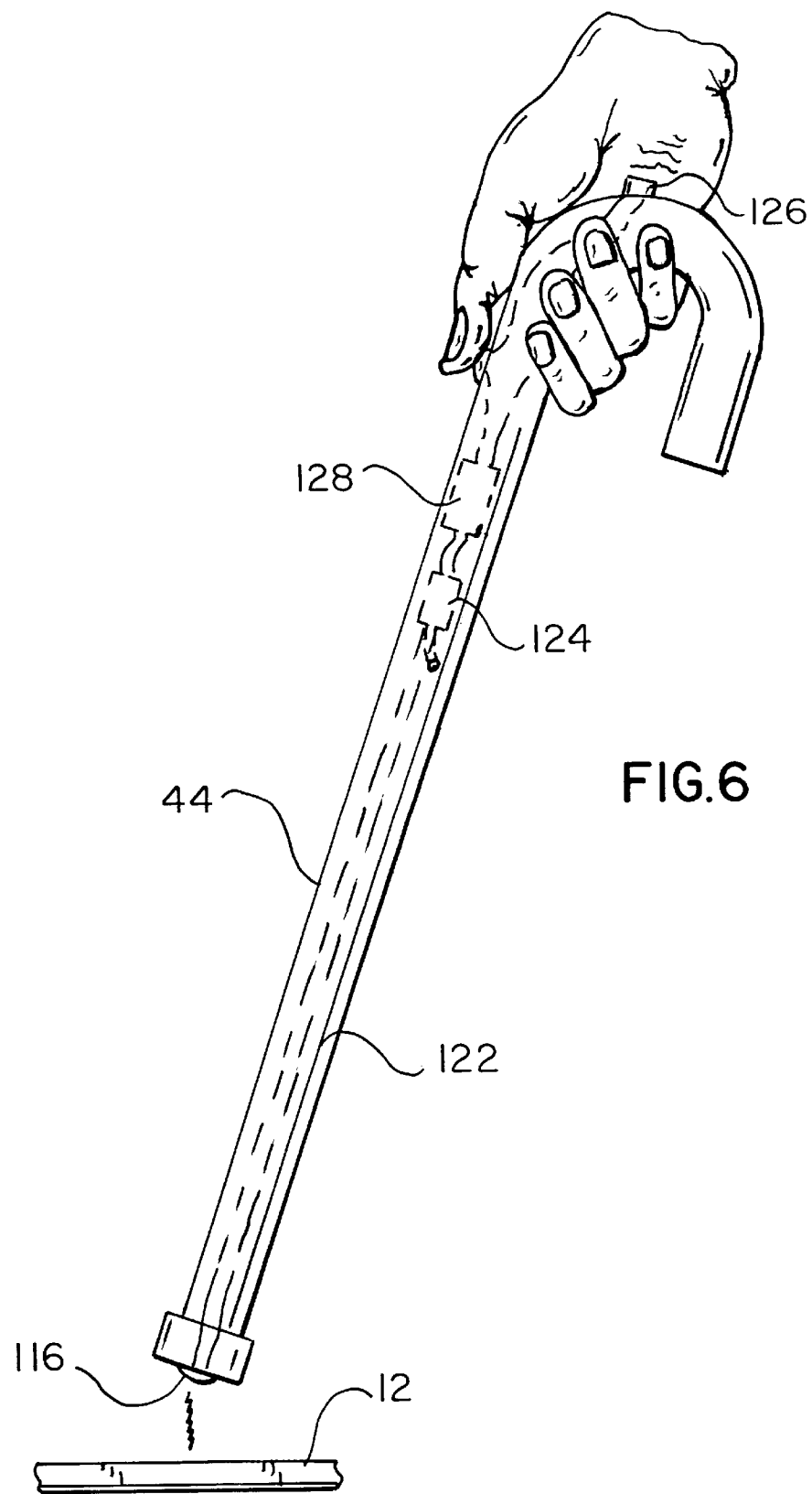
FIG. 6 is a schematic view of a walking cane that has been provided with sensing and signalling means in accordance with the invention.

In FIG. 6 is shown the application of the present invention to an otherwise conventional cane 44. Therein, there is provided a conductivity proximity sensor 116, which is in electrical communication to wires 122, with signalling means 124. Batteries 128 within said cane 44 are also shown, as is vibratory output 126 of signalling means 124. Thereby, the system as shown in FIGS. 1, 2 and 3 may be advantageously utilized by a handicapped person wishing to use a conventionally appearing walking cane.

Figure 7:
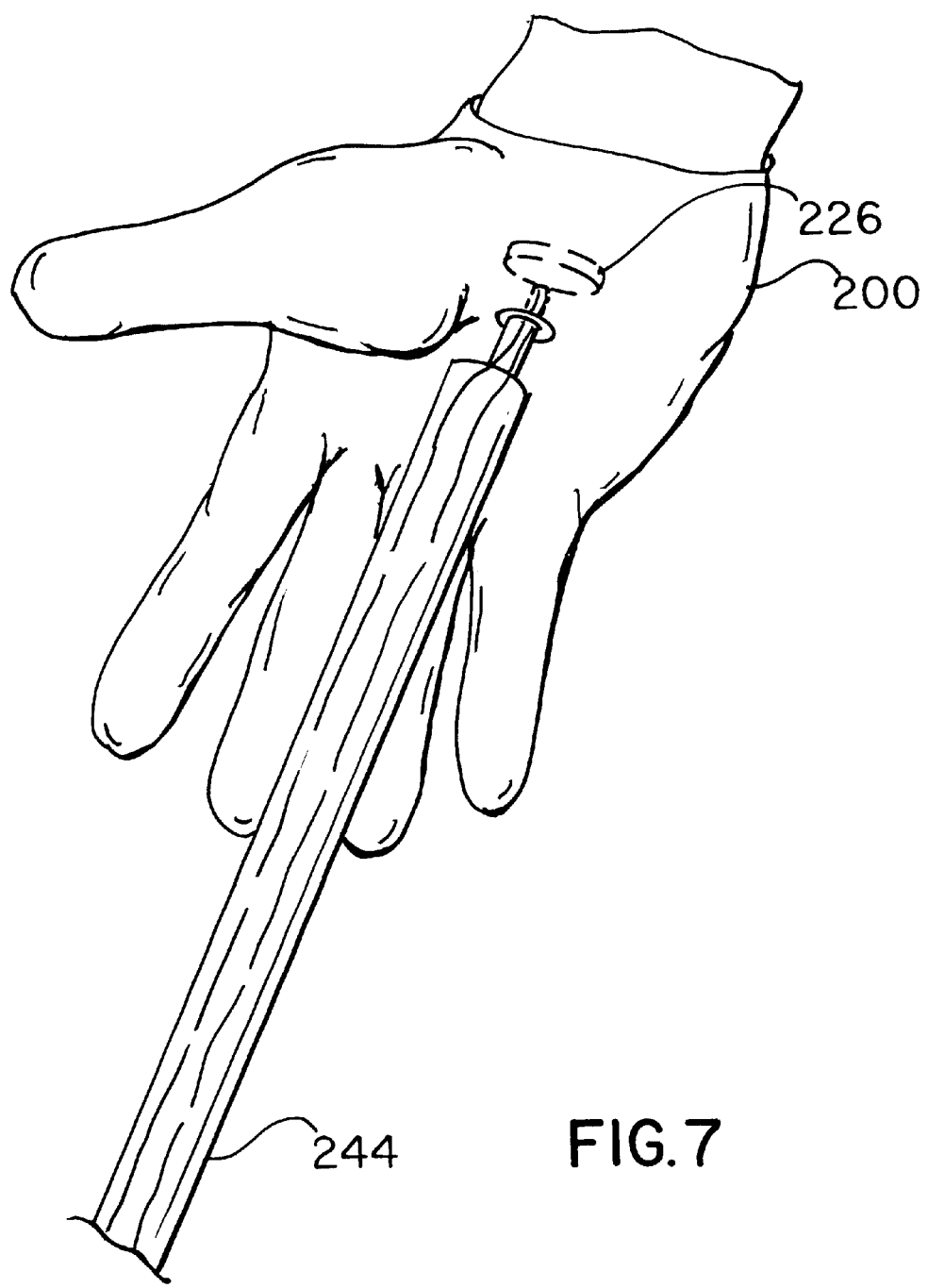
FIG. 7 is an enlarged view of the upper portion of another embodiment of the invention.

A variation of the embodiment of FIG. 5 is shown in FIG. 7 wherein the user employs a glove 200 into which is integrated vibratory means 226. In this embodiment, the walking cane 244 will appear as a simple linear rod.

Figure 8:
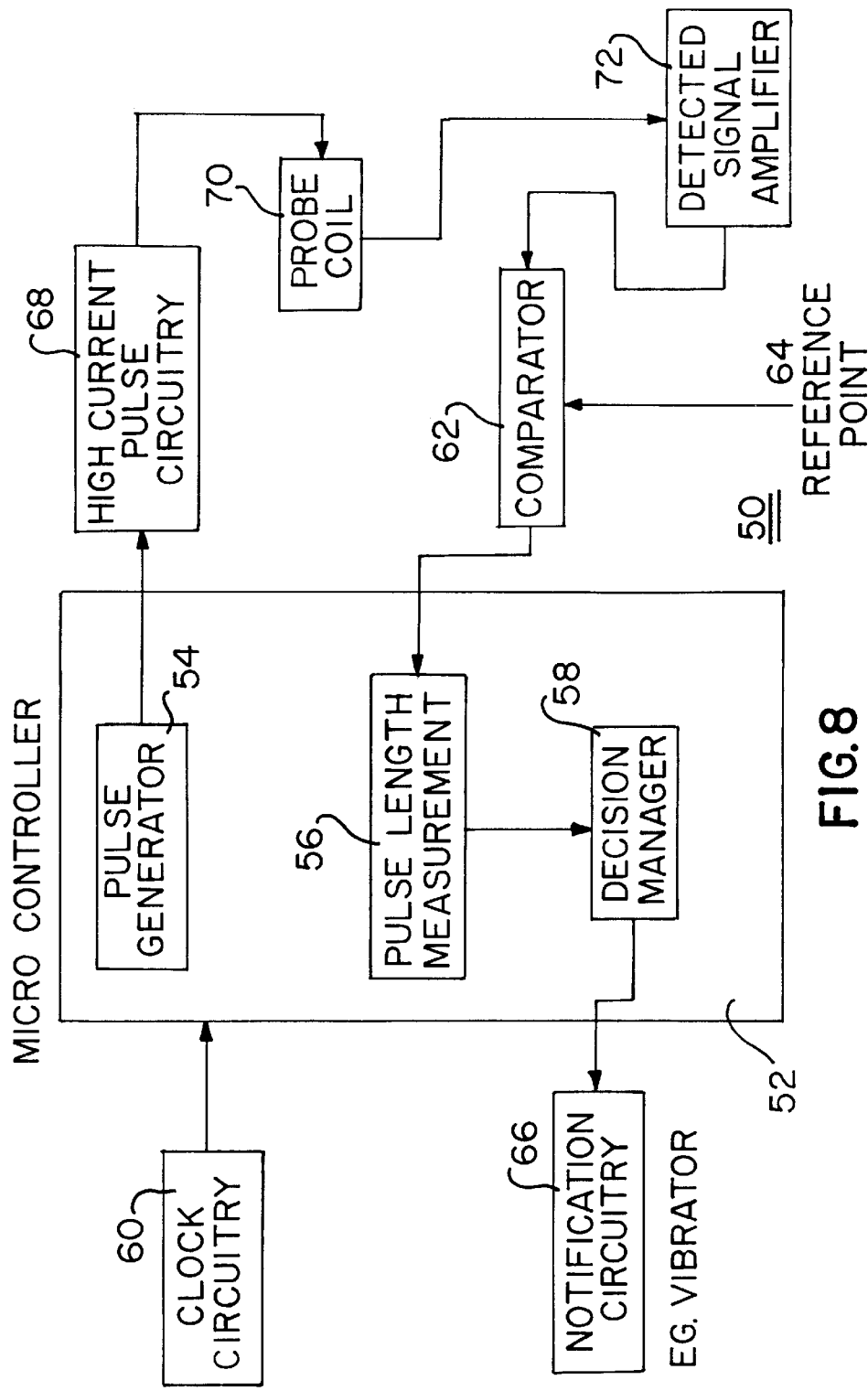
FIG. 8 is an electrical block diagram of a conductor proximity sensor that may be used with the present invention.

In FIG. 8 is shown a representative circuit 50 for said proximity sensors 16 and 116. Therein is provided a microcontroller 52 which includes a pulse generator 54, means for pulse duration measurement 56, and a decision manager 58. The microcontroller is actuated by clock circuitry 60 and a comparator 62 which functions off of a pulse length reference 64. Said inputs 60 and 62 generate microcontroller outputs of notification circuitry 66 (such as vibrators/signalling means 24), and a high current pulse circuit 68 which powers a probe coil/inductor 70 which inputs to means 72 for amplifying any detected signal, i.e., any change in the pattern of capacitive density about the conductors 12. Amplifier means 72 feeds into said comparator 62 which, in turn, feeds into said pulse length measurement means 56 of controller 52. Decision manager 58 determines if a notification event has occurred, e.g., sufficient drop off of pattern density.

Related to the invention are capacitative proximity sensors of the type set forth in U.S. Pat. Nos. 5,619,128; 5,352,974; and 6,023,159. Sensors of this type were originally developed for the purpose of detecting the location of studs behind vertical surfaces such as walls, floors, and similar structures. Sensors of this are also used for security purposes as metal detectors. As is shown in U.S. Pat. No. 6,211,672 (2001) to Bauman, et al, the teaching of which is incorporated by reference. Proximity sensors operate upon a principle of measurement of changes in capacitance due to changes in the dielectric constant of the surface or material to be monitored. Such changes in capacitance may be due to many variables; however, for purposes of the present invention, a change in the dielectric constant of a floor or sidewalk is caused by a change in conductivity, that is, the presence or absence of a continuous electrical conductor, such as said conductors 12A or 12B (see FIGS. 3 and 9), which have been applied to a given walkway. It is, however, to be understood that the measurement of changes of other electrical parameters is within the scope of the electrical detecting means set forth above.

Figure 9:
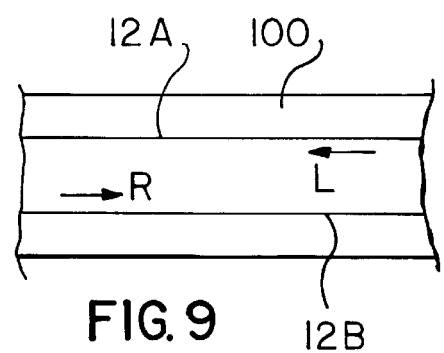
FIG. 9 is a schematic view of an arrangement of conductors in which the walkway of FIGS. 1–3 is linear.

With reference to the views of FIGS. 9 thru 14, there are shown various specific geometries of types of walkways with which conductors 12A and 12B of the inventive system may be used with reference to a walkway. More particularly, in the schematic view of FIG. 9 is shown a linear walkway 100 in which conductor 12A is used for travel by a system user in a first direction indicated by the letter L and associated arrow, and the second conductor 12B for travel in an opposite direction indicated by the letter R and its associated arrow. Given that said conductors 12A and 12B are, in the view of FIG. 9, continuous, this indicates to the visually impaired user that the walkway is a continuous and linear one.

Figure 10:
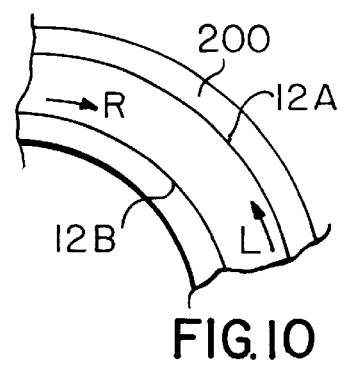
FIG. 10 is a view similar to that of FIG. 9 in which the walkway is curved.

A similar strategy is employed with relationship to curved walkway 200 as is shown in the view of FIG. 10, that is, continuity of the conductor indicates that there is no change in the linear or curvilinear direction of the walkway 200.

Figure 11:
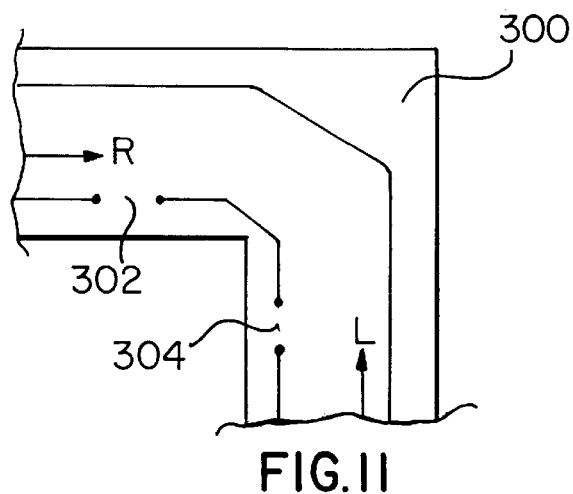
FIG. 11 is a schematic view of a conductor arrangement in which a corner or turn of the walkway occurs.

With respect to FIG. 11, there is shown a corner or elbow portion of a walkway 300, therein a gap 302 is employed within the conductor to warn a user moving in direction R that a turn to the right is approaching. Conversely, gap 304 is employed for a user approaching from an opposite direction to indicate that a turn to the left is approaching. Thereby, a user of the system may be readily advised upon the approach of a turn or elbow in the pathway 300. After passing such turn the conductors continue in the pattern above referenced in FIG. 9.

Figure 12:
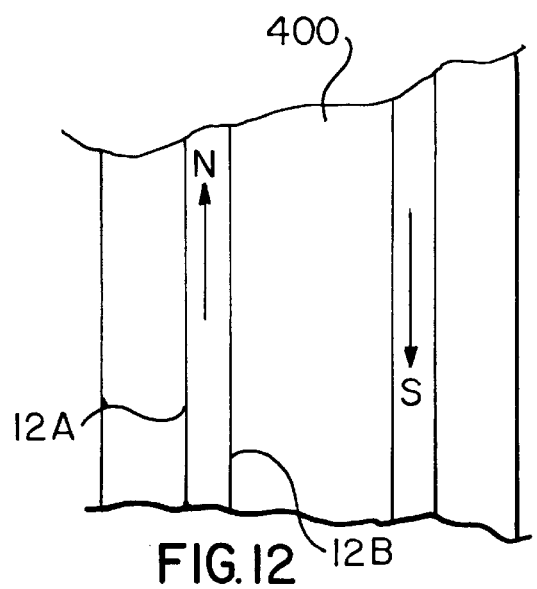
FIG. 12 is a schematic view of a double lane linear walkway.

With reference to FIG. 12, there is shown a variation of the embodiment of FIG. 9, which, typically, would be employed within corridors having a larger width, for example, in airports or shopping malls. Therein, each direction, for example, north and south are indicated by letters N and S with associated arrows, and would be furnished with a separate pairs of conductors 12A and 12B to thereby define a dedicated space or avenue for use by system users and persons having other types of handicaps.

Figure 13:
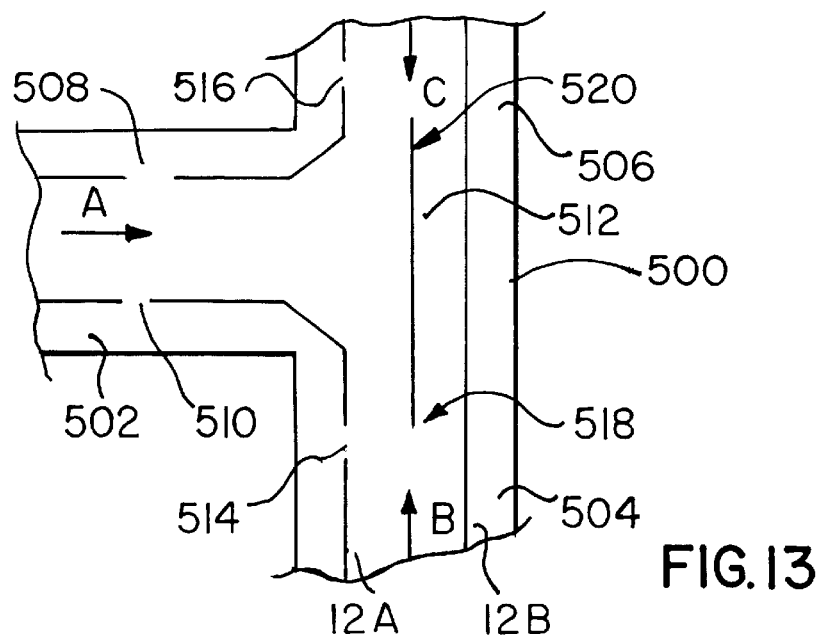
FIG. 13 is a schematic view for a T-intersection of walkways.

With reference to FIG. 13, there is shown a walkway 500 which includes a T intersection; such walkways by definition include an approach 502 in which a user approaches from a direction A, a corridor 504 in which a user approaches from a direction B, and a corridor 506 in which the user approaches from a direction C. In the event of approach from direction A, there are provided gaps 508 and 510. If the user wishes to turn left, he, of course, must bear in that direction. However, in the event that gap 508 or 510 is missed by the user, there is provided a "barrier" conductor 512 by which the user may be warned before colliding with the end of the T intersection. Conductor 512 has the additional function of enabling one approaching the intersection from direction B or direction C to continue in a straight direction if one does not wish to turn into corridor 502. In the case of one approaching the T shaped intersection 500 from direction B or C, and wishing to make a respective left or right turn, the conductor arrangement follows closely the protocol above set forth with respect to FIG. 11. That is, in the case of approach from direction B, there is provided a gap 514 to advise the user that the left hand turn which he desires to make is approaching. Conversely, if one is approaching from direction C, there is provided a gap 516 in the conductor, thereby advising the user that a right hand turn is approaching. It is further noted that, in the case of corridors 504 and 506, ends 518 and 520 of "barrier" conductor 512 may be extended to begin sufficiently well prior to the intersection such that the user's sensor will pick-up the existence of three conductors, namely, 12A, 12B, and 512, this advising the user that he is approaching the T shaped intersection and that a decision must soon be made with regard to whether he is to continue straight into corridor 506 or is to make a left turn into corridor 502. If the user is unsure of which direction in which to proceed he may, at that intersection, request assistance or seek the location of a Braille sign 40 or other user assistance means. See FIG. 2.

Figure 14:
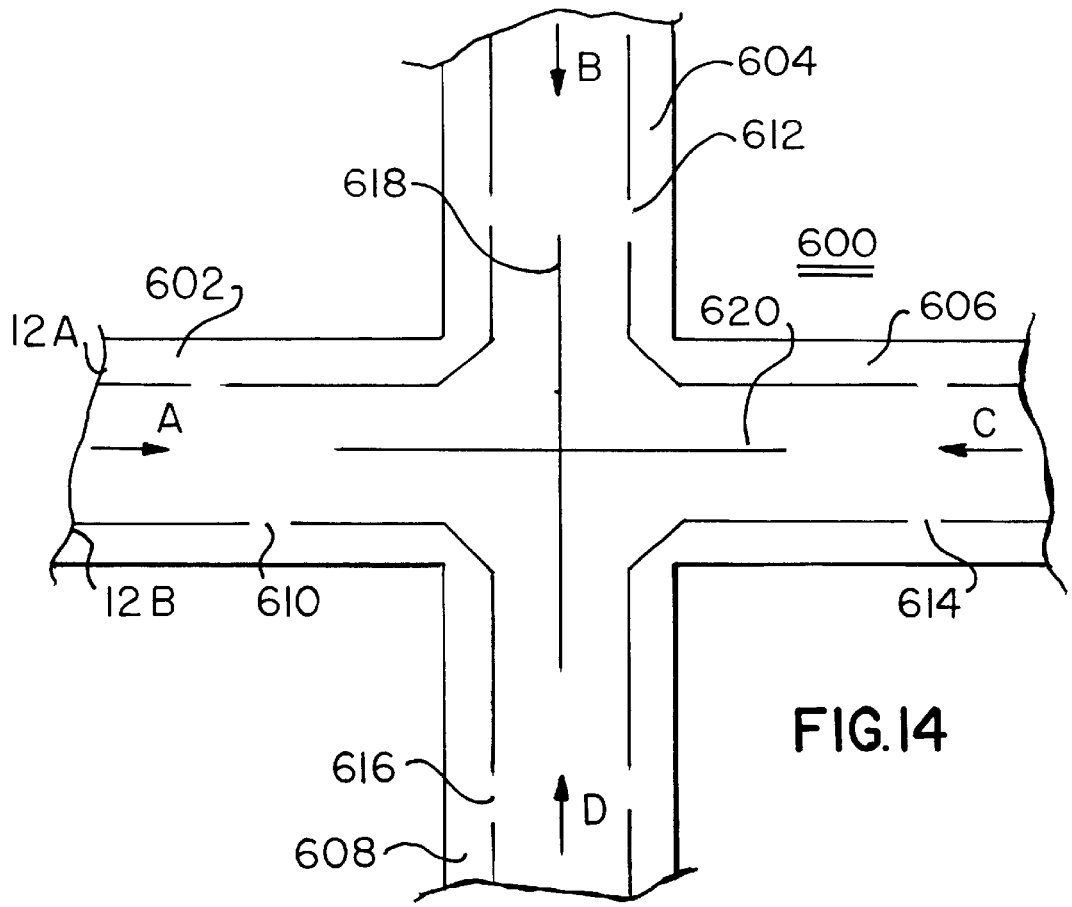
FIG. 14 is a schematic view for a four-way in intersection of walkways.

With reference to the schematic of FIG. 14, there is shown a cross-shaped or four-way intersection 600 in which a user may approach the same from any of directions A, B, C and D as is indicated by the respective arrows therein, these arrows corresponding to corridors 602, 604, 606, and 608 respectively. Therein, in the fashion above described in FIGS. 11 and 13, there are provided respective gaps 610, 612, 614 and 616 by which one approaching from any of said directions A, B, C and D may be appropriately advised of an impending turn to either the left or the right, if the user wishes to turn in either direction. Further, in the manner above described with respect to FIG. 13, there are provided "barrier" conductors 618 and 620 which, as above noted, serve two functions, the first that of advising the user that he has passed, or is about to pass, a turn onto a left or right corridor and the second function, that of a center conductor between the two standard conductors 12A and 12B, to warn the user that he is approaching either a T or a cross-shaped intersection and, as well, to guide him through the intersection if he wishes to proceed across intersection 600 into a corridor co-linear with the one from which he is arriving.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the claims appended herewith. Other such embodiments may include adaptation of the probe 15 or sensor 16 for use by fire, security and emergency personnel.

Having thus described our invention, what we claim as new, useful and non-obvious and, according, secure by Letter Patent of the United States is:

1. A system for guiding the visually handicapped, comprising:
   (a) a continuous electrical conductor of a substantially uniform conductivity embedded within a walkway to be traversed by a user;
   (b) means for detecting proximity of an object to said conductor, said object selected from the group consisting of a shoe of said user and a tip of a walking cane; and
   (c) signalling means in electrical communication with said detecting means.

2. The system as recited in claim 1, in which said signalling means comprises vibratory means.

3. The system as recited in claim 2 further comprising:
   switch means, within an electrical circuit including said detecting means, for closing said circuit responsive to movement of said object.

4. The system as recited in claim 2 further in which said electrical conductor comprises:
   an irregularity of conductivity thereof provided at walkway locations of interest to a user.

5. The system as recited in claim 4 in which said locations of interest include walkway intersections, bathrooms, and Braille-coded information centers.

6. The system as recited in claim 4 further comprising means for providing different patterns of irregularity to indicate different advisories to the system user.

7. The system as recited in claim 2 in which said conductor and a second conductor comprise a pair of parallel conductors.

8. The system as recited in claim 2 in which said walkway comprises a pedestrian crossing at a public street.

9. The system as recited in claim 2 in which said walkway comprises a corridor within an enclosed structure.

10. The system as recited in claim 2 in which said walkway comprises a pathway within a residential structure.

11. The system as recited in claim 2 in which said vibratory means comprises a part of a shoe or heel of a shoe.

12. The system as recited in claim 1 further comprising:
    switch means, within an electrical circuit including said detecting means, for closing said circuit responsive to movement of said object.

13. The system as recited in claim 12 further comprising:
    manual switch means for activating said proximity detecting means by said user to initiate system use.

14. A method for guiding the blind, comprising the steps of:
    (a) installing a continuous conductor within a walkway to be traversed by a user;
    (b) embedding a sensor for detecting proximity of said conductor within a shoe or heel sole of a shoe of said user; and
    (c) providing signalling means in electrical communication with said sensor.

15. The method as recited in claim 14 further comprising the step of:
    providing means for enabling said sensor responsive to motion of said shoe.

16. The system as recited in claim 14 further comprising the step of:
    providing a gradient or irregularity in the conductivity of said conductor at intersections, rest rooms, and other locations of significance to the user with said walkway.

* * * * *